(12) United States Patent
Burroughs

(10) Patent No.: US 6,657,926 B2
(45) Date of Patent: Dec. 2, 2003

(54) MAGNETIC FIELD MODULATION COIL

(75) Inventor: Alan C. Burroughs, San Jose, CA (US)

(73) Assignee: Terastor Corporation, Milpitas, CA (US)

( * ) Notice: Subject to any disclaimer, the term of this patent is extended or adjusted under 35 U.S.C. 154(b) by 0 days.

(21) Appl. No.: 09/916,788

(22) Filed: Jul. 27, 2001

(65) Prior Publication Data

US 2002/0085460 A1 Jul. 4, 2002

Related U.S. Application Data

(60) Provisional application No. 60/222,137, filed on Jul. 27, 2000.

(51) Int. Cl.[7] ............................................... G11B 11/14
(52) U.S. Cl. ............................. 369/13.22; 369/44.23; 369/112.24
(58) Field of Search ........................... 369/13.11, 13.02, 369/13.23, 13.33, 13.28, 118, 126, 44.41

(56) References Cited

U.S. PATENT DOCUMENTS

| | | | | |
|---|---|---|---|---|
| 5,315,574 A | * | 5/1994 | Saimi et al. ................. | 369/109 |
| 5,396,478 A | * | 3/1995 | Krantz ..................... | 369/44.41 |
| 5,535,179 A | * | 7/1996 | Noguchi ............... | 369/44.35 X |
| 5,668,787 A | * | 9/1997 | Shigematsu et al. ... | 369/77.2 X |
| 5,903,525 A | * | 5/1999 | McDaniel et al. ........ | 369/13.23 |
| 5,978,320 A | * | 11/1999 | Nakaoki et al. .......... | 369/13.32 |
| 6,055,222 A | * | 4/2000 | Knight ........................ | 369/112 |
| 6,064,632 A | * | 5/2000 | Nakaoki et al. .......... | 369/13.32 |
| 6,069,853 A | * | 5/2000 | Novotny et al. .......... | 369/13.33 |
| 6,104,675 A | * | 8/2000 | Hatam-Tabrizi ......... | 369/13.28 |
| 6,111,842 A | * | 8/2000 | Nishino et al. ............. | 369/118 |
| 6,192,008 B1 | * | 2/2001 | Kim ......................... | 369/13.02 |
| 6,226,233 B1 | * | 5/2001 | McDaniel et al. ........ | 369/13.32 |
| 6,243,350 B1 | * | 6/2001 | Knight et al. ................ | 369/126 |
| 6,307,832 B1 | * | 10/2001 | Novotny et al. ............. | 369/300 |
| 6,327,231 B1 | * | 12/2001 | Sano et al. ............... | 369/44.23 |
| 6,407,966 B1 | * | 6/2002 | Gage et al. ............... | 369/44.23 |
| 6,434,087 B1 | * | 8/2002 | Schell et al. ............ | 369/116 X |

* cited by examiner

Primary Examiner—Aristotelis M. Psitos
(74) Attorney, Agent, or Firm—Fish & Richardson P.C.

(57) ABSTRACT

A driver in a far-field magneto-optical ("MO") system has a read/write head that includes an objective lens for focusing a laser beam onto an MO disk. The objective lens is housed in an objective lens holder. A magnetic biasing coil is mounted to the bottom of the objective lens holder, between the objective lens and the MO disk. The coil includes an aperture to allow the laser beam to pass through the coil and onto a surface of the disk. The objective lens holder is moved up and down as the disk spins by an actuator to maintain the laser beam in focus on the MO disk surface. This maintains the objective lens and the coil precisely at predetermined distances from the MO disk surface, despite irregularities in the disk and disk wobble.

21 Claims, 2 Drawing Sheets

MAGNETIC FIELD MODULATION COIL

CROSS-REFERENCE TO RELATION APPLICATION

This application claims priority to U.S. Provisional Application Serial No. 60/222,137, filed on Jul. 27, 2000, and entitled "Magnetic Field Modulation Coil."

BACKGROUND

Data storage is an important aspect of today's information technology. A great deal of effort has been made by the storage industry to increase the real data density of a storage medium in order to meet the ever increasing demand for higher capacity storage devices.

Magnetic storage devices such as fixed or removable magnetic disks and tapes are widely-used conventional storage devices. Optical storage devices, such as CD-ROMs, are emerging as an alternative technology to the conventional magnetic technology because of their potential for high-density data storage.

Magneto-optical ("MO") drives use both magnetic and optical effects to read and write data. MO disks are typically plastic or glass disks coated with a layer of a material with special magnetic properties. This layer of magnetic material, typically a rare earth-transition metal compound such as TbFeCo, serves as an active layer for storing data. The active layer may be covered with an optically transparent protective layer.

To write data to the MO disk, a high intensity laser is used to heat the material up to its Curie point, allowing its magnetization to be altered by a magnetic write head including a biasing coil, and then "frozen" in the (altered) magnetic state as region cools.

The MO driver may be a far-field system in which the read/write head, including optics for focusing the laser and the magnetic coil, is kept within a fixed distance from the media by a focus servo system. Alternatively, the MO driver may be a near-field system in which the read/write head is kept very close to the media, for example, using a "flying" head configuration similar to the Winchester design used in hard disk drives. Regardless of the type of configuration, the magnetic coil must be close enough to the media to generate enough magnetic field in the recording layer.

SUMMARY

In an embodiment, a driver in a far-field magneto-optical ("MO") system has a read/write head that includes an objective lens for focusing a laser beam onto an MO disk. The objective lens is housed in an objective lens holder. A magnetic biasing coil is mounted to the bottom of the objective lens holder, between the objective lens and the MO disk. The coil includes an aperture to allow the laser beam to pass through the coil and onto a surface of the disk. The coil may generate a modulated magnetic field for writing data to the MO disk in a single pass.

he objective lens holder is moved up and down as the disk spins by an actuator to maintain the laser beam in focus on the MO disk surface. The actuator is controlled by a focus servo system including an optical feedback system. The focusing operation maintains the objective lens and the coil precisely at predetermined distances from the MO disk surface, despite irregularities in the disk and disk wobble.

Since the coil remains near the surface of the MO disk (e.g., between about 5 and 50 microns), the coil may be relatively small, allowing it to switch at high speeds. For example, the coil may have an inner diameter of about 90 microns and generate a field of about 1 Oe/mA.

DETAILED DESCRIPTION

Figure 1:
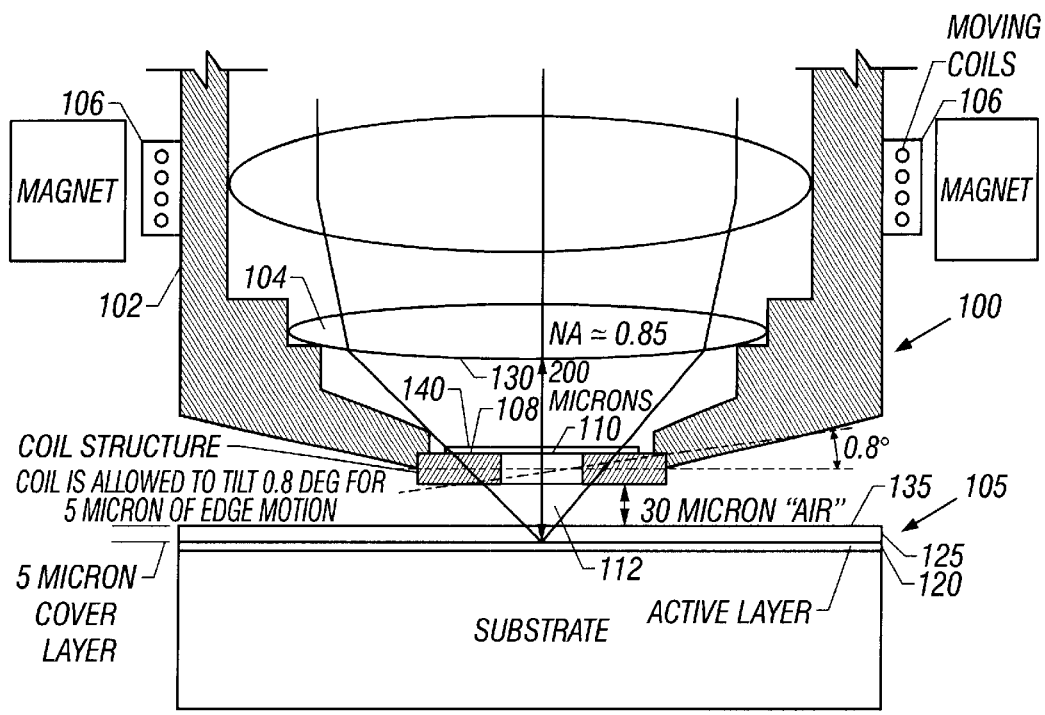
FIG. 1 is a sectional view of a read/write head according to an embodiment.

FIG. 1 illustrates a read/write head 100 according to an embodiment. The head includes an objective lens holder 102 that houses an objective lens 104 used to focus a laser beam onto a recording medium 105. An actuator 106 is controlled by a servo system to maintain the objective lens a certain distance from the surface of the recording medium. A magnetic biasing coil 108 used to write data to the recording medium is mounted to the bottom of the objective lens holder 102, between the objective lens 104 and the recording medium 105. The coil 108 includes a central aperture 110 to enable the focused laser beam 112 to pass through the coil and onto the surface of the recording medium.

The read/write head may be used in a magneto-optical ("MO") drive system to write data to and read data from MO disks. MO drives use both magnetic and optical effects to read and write data. A layer within the MO disk contains magnetically sensitive elements, e.g., magnetic domains, which are arranged vertically. Typically this active, or recording, layer 120 contains a rare earth-transition metal compound such as TbFeCo.

To write to the MO disk, the recording layer is heated to the Curie point, approximately 200° C., with a laser pulsing at a fixed rate. The Curie point is a threshold above which the magnetic domains are susceptible to moderate (about 300 Guass) external magnetic fields. The external magnetic field is applied by the coil to set the magnetization vector, which represents the polarization of the magnetic domains, in the heated region either up (representing an "one" bit) or down (representing a "zero" bit).

Because the written magnetic polarity is "frozen into" the disk once the written area in the recording layer falls below the Curie point, MO disks are not susceptible to magnetic fields, as are conventional magnetic media.

Data may be read from the MO disk optically. The laser is used at a low power, which does not heat up the disk. Depending on the recorded magnetic polarity, the polarity of the laser light reflected from the disk is rotated a few degrees either way. This rotation is called the "Kerr effect." The drive detects this, and thus determines whether a one or zero bit was read.

In conventional MO drives, the laser switches on and off and the recording magnet maintains a constant field upward (for recording) or downwards (for erasure) when writing to the disk. As a result, the MO driver may only record on a sector of a disk after that sector has been erased. This may be accomplished with separate erase and record heads, which adds to the cost and mechanical complexity of the drive, or by recording on separate erase and record passes, which doubles the time it takes to write data.

In such conventional MO drives, the external magnetic coil used to generate the magnetic bias field is relatively large, such that the inductance of the coil is also relatively large. Consequently, the coil cannot be easily switched at high speed.

Magnetic field modulation may be used to achieve a single pass write, with corresponding improvement in data throughput. In magnetic field modulation, the laser activity stays constant (e.g., pulses at a fixed rate) and the magnetic field is modulated instead. This requires a small magnetic bias coil that can be switched at the data rate.

Crescent recording may be used in conjunction with magnetic field modulation. In crescent recording, the bias coil field is switched from one magnetic direction to an opposite direction for recording before the disk moves more than on focused spot diameter. This allows recording of crescent shaped magnetic domains. It has been shown that multiple crescents may be recorded within one optical spot diameter, where this diameter is the typical single spot recording on the media. Thus, with this crescent recording method, the linear storage density can be significantly increased over conventional MO recording that uses a larger external coil.

Magnetic field modulation may be implemented using a "near-field" configuration in which the optics and biasing coil may be provided on a "flying" head, similar to the Winchester design used for hard disk drives. The flying head and disk are positioned relative to each other such that the optical spacing therebetween is less than one wavelength of the light produced by the light source. A very small spot is projected onto the top surface of the disk by evanescent wave, or near-field, coupling. An air-bearing surface may be provided at the base of the flying head to maintain a desired focus without the need for conventional servo optics for focusing. However, flying head configurations may be difficult to implement in some applications and may be subject to head crashes, which may damage the driver and/or disk.

In an embodiment, magnetic field modulation is implemented using a far-field configuration, in which a non-flying head includes the optics and biasing coil, as shown in FIG. 1. The head 100 is separated from the media by a very close distance, but not so close that efficient coupling of evanescent waves occurs. A servo focusing system, such as those used in CD-ROM drives, may be used to directly focus the beam onto the recording surface.

Figure 2:
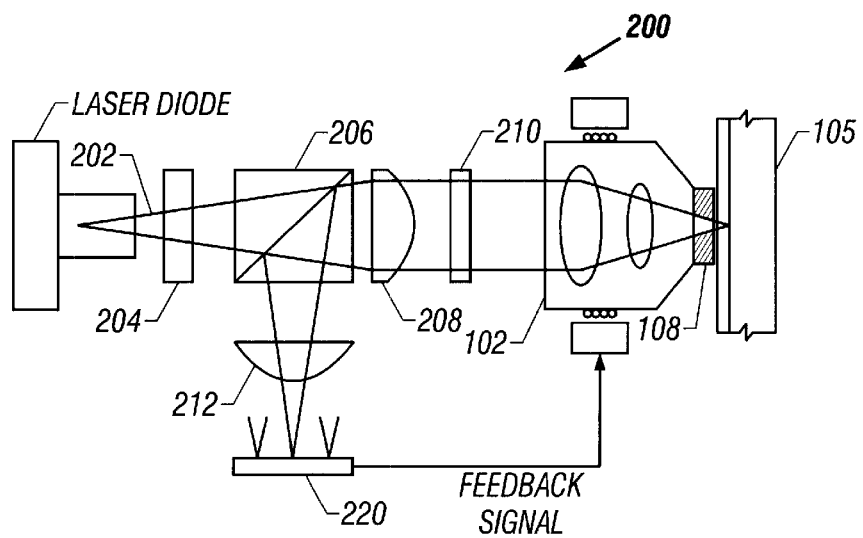
FIG. 2 is a block diagram of a focusing system according to an embodiment.

The servo system is responsible for the focusing and tracking of the laser beam on the MO disk. The servo system monitors the focus of the laser beam, and hence the distance between the objective lens and the recording surface, using a feedback system that includes photodectors. FIG. 2 illustrates a three-beam focusing system 200. The laser beam first passes through a diffraction grating 204, which is a screen with slits spaced only a few wavelengths apart. Many beams emerge from the other side, diffracted at different angles. The central beam and the first beam on either side of the central beam go on to pass through a polarization beam splitter 206. The three beams pass through the beam splitter and are aligned by a collimator 208. Between the collimator and the objective lens is a quarter wave plate 210, which rotates the plane of polarization of the three beams by 45 degrees.

The beams then pass through the objective lens in the objective lens holder 102 and onto the MO disk 105. The central beam follows the spiral track and the other two beams straddle either side of the central beam. On the return path, the quarter wave plate rotates the polarization of the beams a further 45 degrees so that when the beams strike the beam splitter, they are deflected off to a cylindrical lens 212 on one side. Emerging from this lens, the beams finally strike the photodiode array 220.

Figure 3:
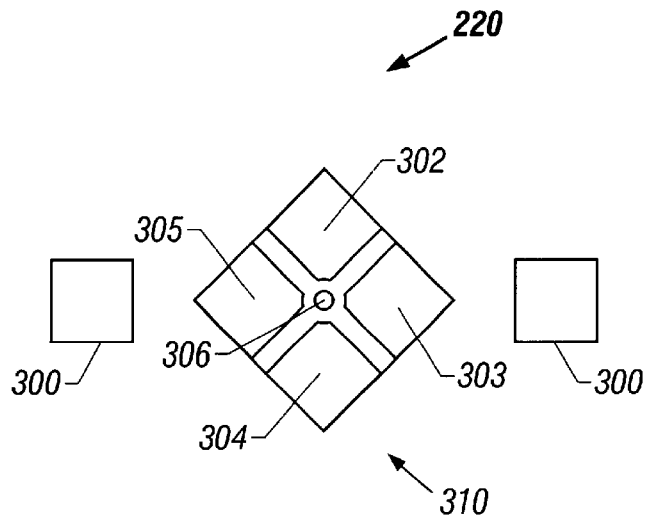
FIG. 3 is a plan view of a photodetector array according to an embodiment.

The two side beams are monitored by two photodiodes 300, shown in FIG. 3, which generate a radial tracking error signal. The central beam produces a circular dot on four photodiodes 302–305 on a quadrant photodetector 310 when focus is correct. The sum of their outputs is the data signal. Due to the astigmatic properties of the cylindrical lens, a focus error will elongate the spot in either of two perpendicular directions, depending upon near or far focus error. The quadrant photodiode may also include a small central detector 306, which is most illuminated when the central beam is at, or near, best focus on the disk.

The objective lens may have a high numerical aperture. The working distance of the focusing optics is the distance from the final lens surface 130 to the first physical surface 135 of the media. For lenses with a high numerical aperture, this distance becomes quite small. In an embodiment, the objective lens has a numerical aperture of 0.85, and a working distance of 200 microns. The servo system maintains this distance within a tolerance of ±0.2 microns.

The head 100 takes advantage of the precise positioning provided by the servo system to safely position the magnetic biasing coil 108 in close proximity to the recording media. Since the coil is closer to the recording layer, a smaller magnetic field is needed to write data. Hence, the coil can be made smaller than the coils used in conventional MO drives, with a corresponding reduction in inductance. The lower inductance may enable the coil to perform the high-speed (data rate) switching necessary to perform single pass direct writing of data to the MO disk.

The coil may be mounted on the objective lens holder below the objective lens, i.e., between the objective lens and the MO disk. The coil 108 moves up and down with the objective lens as controlled by the actuator 106 and the focus servo system. The coil may be set very close to the disk, e.g., between about 5 microns to 50 microns from the surface of the disk, and maintained at close to the set distance, e.g., +/−0.2 micron, by the focus servo system controlling the actuator. The coil may be allowed to tilt approximately 0.8 degrees to permit 5 microns of edge motion. A capacitive or inductive probe may be provided in the head assembly to ensure that the coil does not contact the disk. A coil so mounted may be used to write data at the very edge of the disk 105.

The aperture 110 allows the focused laser beam exiting the objective lens to pass through the coil and onto the disk, as well as any reflected portion of the beam to pass back through the coil. The aperture may have a circular, elliptical, or irregular (e.g., rectangular) shape. A window 140 may be provided over the aperture, closing off and perhaps sealing the space in the objective lens holder between the objective lens and the coil.

Figure 4:
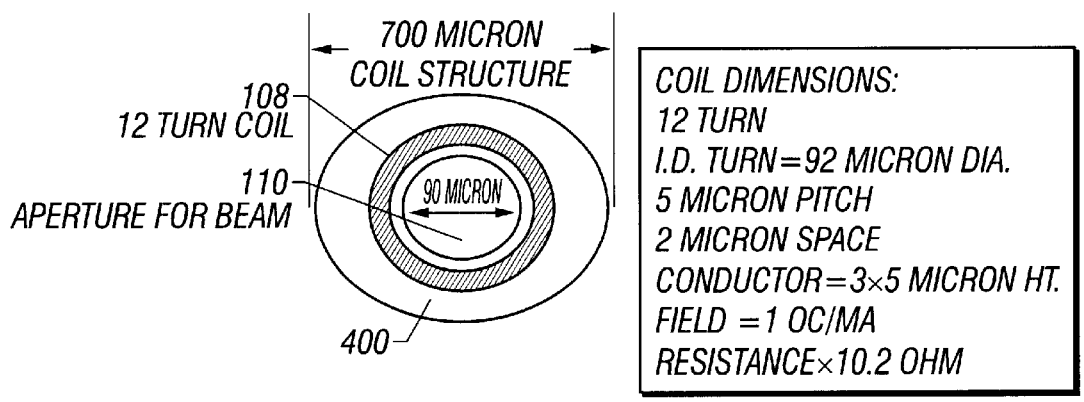
FIG. 4 is a plan view of a coil according to an embodiment.

In an embodiment, the coil is a twelve-turn coil with an inner diameter of 92 microns and a 90-micron wide central aperture, as shown in FIG. 4. The spiraled conductor coil may be about 3 microns wide by 5 microns high. Neighboring windings in the coil may be separated by a space of about 2 microns. The coil may have a resistance of about 10.2 ohms and produce a field of about 1 Oe/mA.

The coil may be provided on a substrate 400 of silicon or other stiff material. The coil substrate is relatively thin, e.g., about 5 to 200 microns thick. The coil may be recessed into the coil substrate.

The coil is modulated with data to be written to the MO disk. The MO disk may be a "first-surface" disk, in which the top active layer is the recording layer. The recording layer may be covered by an optically transparent protective layer 125 about 5 to 20 microns thick. Furthermore, a capping layer of a non-magnetic material may be provided over the recording layer to prevent spots. The capping layer may be relatively thick, e.g., 2 to 20 microns. Also, the MO disk may be dual-sided. Dual heads, one provided on each side of the MO disk, may be used to access and transfer data on both sides of the disk.

The coil may also be used in conjunction with a head including two optical elements. The optical elements may include the objective lens and a silicon immersion lens (SIL) to tightly focus the laser beam to create an ultra-small spot on the MO disk.

The coil may also be used to read data from the MO disk, as in a Magnetic Amplifying Magneto-Optical System (MAMMOS) system, developed by Hitachi-Maxell. In MAMMOS media, an extra magnetic layer above the recording layer is used to amplify a signal of a magnetic domain in the recording layer during playback. For example, an amplifying layer of GdFeCo can be formed on a conventional TbFeCo recording layer of an MO disk. The amplifying layer can be used to ensure enhanced playback of high-density recording spots, e.g., with a spot size around 0.1 to 0.3 microns in diameter.

In a MAMMOS readout operation, the small magnetic domain of the recording layer is heated by a focused laser beam. Magnetic transformation causes a new domain with the same magnetic orientation to form on the amplifying layer on top of the recording layer. The newly formed magnetic domain in the amplifying layer grows if an external magnetic field is applied in the same direction as the local magnetic orientation. This amplification improves the signal detection in readout or enhances the apparent signal-to-noise ratio of the recorded bit in the recording layer.

For example, the actual magnitude of the readout signal produced by a MAMMOS disk can be more than three times as large as the signal generated from the same recording layer with a conventional recording method. A reversed external magnetic field is applied to an amplified domain to eliminate the domain in the amplifying layer after the domain is read out and before the next domain is amplified for readout. Hence, the external magnetic bias field is modulated at the data rate of the storage system. This allows recording of smaller domains than could normally be read with a given focused laser spot. This new type of MO media may be used to increase the areal density of a flying head MO system of the present invention, since the small bias coil is built into the head and can be modulated at very high speeds.

A number of embodiments have been described. Nevertheless, it will be understood that various modifications may be made without departing from the spirit and scope of the invention. For example, the head and servo system may be used in focus acquisition where focus is acquired on stationary (non-rotating) media. Accordingly, other embodiments are within the scope of the following claims.

What is claimed is:

1. Apparatus comprising:
   an objective lens adapted to focus a laser beam onto a recordable medium;
   an objective lens holder housing the objective lens;
   an actuator operative to move the objective lens holder;
   a medium holder adapted to hold the recordable medium;
   a coil mounted on the objective lens holder between the objective lens and the medium holder, said coil operative to generate a modulated magnetic field; and
   a servo system operative to control the actuator to move an order to maintain a first distance between a first surface of the coil and a first surface of the recordable medium in response to a fed back optical signal from the recordable medium,
   wherein the coil is tiltably mounted to the objective lens holder such that the coil may be tilted with respect to the objective lens.

2. The apparatus of claim 1, wherein the first distance is between about 5 microns and 50 microns.

3. The apparatus of claim 2, wherein the first distance includes a tolerance of about ±0.2 microns.

4. The apparatus of claim 1, wherein the recordable medium comprises a magneto-optical disk.

5. The apparatus of claim 4, wherein the recordable medium comprises a first-surface magneto-optical disk.

6. The apparatus of claim 1, wherein the servo system is operative to control the actuator to move the actuator to maintain a second distance between a first surface of the objective lens and the first surface of the recordable medium.

7. The apparatus of claim 6, wherein the objective lens has a high numerical aperture.

8. The apparatus of claim 7, wherein the objective lens has a numerical aperture of 0.85.

9. The apparatus of claim 8, wherein the second distance is about 200 microns.

10. The apparatus of claim 1, wherein the coil includes an aperture adapted to enable the laser beam from the objective lens to pass through the coil and strike the recordable medium.

11. The apparatus of claim 10, wherein the aperture has a diameter of approximately 90 microns.

12. The apparatus of claim 1, wherein the coil is operative to generate a field of about 1 Oe/mA.

13. The apparatus of claim 1, wherein the coil has an inner diameter less than about 100 microns.

14. The apparatus of claim 1, wherein the servo system comprises a quadrant photodetector.

15. The apparatus of claim 14, wherein the quadrant photodetector comprises a central close-to-focus detector.

16. The apparatus of claim 1, wherein the fed back optical system comprises a portion of the laser beam reflected from a surface of the recordable medium and passing through an aperture in the coil.

17. The apparatus of claim 1, further comprising a silicon immersion lens housed in the optical lens housing.

18. The apparatus of claim 1, wherein the apparatus comprises a far-field read/write head operative to write data in a single pass.

19. The apparatus of claim 1, wherein the apparatus comprises a magnetic field modulation read/write head.

20. Apparatus comprising:
   an objective lens adapted to focus a laser beam onto a recordable medium;
   an objective lens holder housing the objective lens;
   an actuator operative to move the objective lens holder;
   a medium holder adapted to hold the recordable medium;
   a coil mounted on the objective lens holder between the objective lens and the medium holder, said coil operative to generate a modulated magnetic field; and
   a servo system operative to control the actuator to move in order to maintain a first distance between a first surface of the coil and a first surface of the recordable medium in response to a fed back optical signal from the recordable medium,
   wherein the coil is tiltably mounted to the objective lens holder such that the coil may be tilted with respect to the objective lens, wherein the coil is adapted to be tilted to an angle of about 0.8 degrees.

21. The apparatus of claim 20, wherein the recordable medium comprises a magneto-optical disk, and the apparatus comprises a read/write head operative to access data at an outer edge of the magneto-optical disk.

* * * * *